US009161293B2

(12) United States Patent
Choudhary et al.

(10) Patent No.: US 9,161,293 B2
(45) Date of Patent: Oct. 13, 2015

(54) METHOD AND APPARATUS FOR USING RECEIVED SIGNAL STRENGTH INDICATOR (RSSI) FILTERING TO PROVIDE AIR-TIME OPTIMIZATION IN WIRELESS NETWORKS

(75) Inventors: Seemant Choudhary, Fremont, CA (US); Bep Verberk, Ontario (CA); Tilak Ravi, Milpitas, CA (US)

(73) Assignee: AVAYA INC., Basking Ridge, NJ (US)

( * ) Notice: Subject to any disclaimer, the term of this patent is extended or adjusted under 35 U.S.C. 154(b) by 828 days.

(21) Appl. No.: 13/247,599

(22) Filed: Sep. 28, 2011

(65) Prior Publication Data

US 2013/0077505 A1    Mar. 28, 2013

(51) Int. Cl.
*G01R 31/08* (2006.01)
*H04W 48/14* (2009.01)
*H04W 48/16* (2009.01)
*H04W 48/20* (2009.01)
*H04W 48/02* (2009.01)

(52) U.S. Cl.
CPC .............. *H04W 48/14* (2013.01); *H04W 48/02* (2013.01); *H04W 48/16* (2013.01); *H04W 48/20* (2013.01)

(58) Field of Classification Search
CPC combination set(s) only.
See application file for complete search history.

(56) References Cited

U.S. PATENT DOCUMENTS

| | | | |
|---|---|---|---|
| 8,270,905 B1* | 9/2012 | Cahill et al. ............... | 455/67.11 |
| 2005/0163155 A1* | 7/2005 | Yang et al. .................... | 370/465 |
| 2005/0164724 A1* | 7/2005 | Marinier et al. .............. | 455/515 |
| 2007/0242621 A1* | 10/2007 | Nandagopalan et al. ...... | 370/254 |
| 2007/0280130 A1* | 12/2007 | Matsuo ......................... | 370/252 |
| 2008/0009307 A1* | 1/2008 | Sekhar et al. ................. | 455/524 |
| 2009/0163204 A1 | 6/2009 | Farnsworth et al. | |
| 2010/0111063 A1 | 5/2010 | Ji | |
| 2010/0135178 A1* | 6/2010 | Aggarwal et al. ............. | 370/252 |
| 2010/0248640 A1* | 9/2010 | MacNaughtan et al. ... | 455/67.11 |
| 2010/0304738 A1* | 12/2010 | Lim ............................ | 455/426.1 |
| 2010/0329132 A1* | 12/2010 | Raghothaman et al. ...... | 370/252 |
| 2011/0026506 A1* | 2/2011 | MacNaughtan et al. ...... | 370/338 |
| 2011/0034179 A1* | 2/2011 | David et al. ................ | 455/456.1 |
| 2011/0110282 A1* | 5/2011 | Wu et al. ....................... | 370/311 |
| 2011/0275361 A1* | 11/2011 | Yavuz et al. ................ | 455/422.1 |
| 2012/0039265 A1* | 2/2012 | Patel et al. .................... | 370/329 |
| 2012/0224484 A1* | 9/2012 | Babiarz et al. ............... | 370/235 |
| 2012/0238217 A1 | 9/2012 | Otani | |
| 2012/0282864 A1* | 11/2012 | Dimou et al. ............... | 455/67.14 |
| 2013/0157651 A1* | 6/2013 | Khaitan et al. ............. | 455/422.1 |
| 2013/0288704 A1* | 10/2013 | Wirola et al. ............. | 455/456.1 |
| 2013/0295926 A1* | 11/2013 | Michel et al. ................. | 455/434 |
| 2013/0329619 A1* | 12/2013 | Carty et al. ................... | 370/311 |
| 2014/0018122 A1* | 1/2014 | Cahill ............................ | 455/513 |

OTHER PUBLICATIONS

UK Search and Examination Report, Jan. 28, 2013, pp. 1-5.

* cited by examiner

*Primary Examiner* — Jung-Jen Liu
(74) *Attorney, Agent, or Firm* — Anderson Gorecki & Rouille LLP

(57) ABSTRACT

A method, apparatus and computer program product for using Received Signal Strength Indicator (RSSI) filtering to provide air-time optimization in wireless networks is presented. At least one message is received at an Access Point (AP) from a mobile unit (MU). A determination is made by the AP whether a received Signal Strength indicator (RSSI) associated with the at least one message from an MU is greater than a predetermined threshold. When the RSSI value associated with the at least one message from na MU is greater than to said predetermined threshold, then a response is generated by the AP and sent to the MU.

18 Claims, 11 Drawing Sheets

METHOD AND APPARATUS FOR USING RECEIVED SIGNAL STRENGTH INDICATOR (RSSI) FILTERING TO PROVIDE AIR-TIME OPTIMIZATION IN WIRELESS NETWORKS

BACKGROUND

An Access Point (AP) in 802.11 infrastructure mode (IBSS) operates at a fixed Radio Frequency (RF) frequency selected from one of the set of frequencies permitted in the country of operation. Each wireless network is uniquely identified by a default alpha-numeric name called an SSID. An AP sends periodic 802.11 beacons to announce its presence on the medium in addition to other 802.11 specific purposes. Beacons may also carry SSID information.

A wireless client (also referred to as a mobile device or mobile unit (MU)) scans the presence of desired SSID on a wireless medium on a given RF using active probing or passive scanning. A wireless device may include, but is not limited to a laptop computer, a cellular telephone, a tablet, a Personal Digital Assistant (PDA) or the like. In active probing, an MU sends an 802.11 broadcast probe request at a lowest supported data rate on a specific frequency and listens for a response from AP(s) on that frequency. The broadcast probe request may be heard by multiple APs on a given frequency. All the APs that hear the broadcast probe may send a unicast response to the wireless client that sent the probe request. Probe responses have almost the same information that is present in the AP beacon. The SSID is always present in the probe response. Probe responses are sent at the same data rate as beacons so they take almost the same time to transmit on the air as beacons. Since the probe responses are unicast, an AP may send one or more retries if the probe response is not acknowledged by the client. Probe responses and probe response retries decrease the wireless medium airtime available for application data communication.

Passive scanning is based on listening for AP beacons or probe responses to other clients to determine the presence of an SSID on an RF frequency. The beacon interval is configurable and can vary from one deployment to another. Due to the variable beacon intervals across different deployments, in order to detect an SSID using a passive scan, the client has to wait for beacons on each RF frequency for unpredictable interval. When beacons do not carry an SSID, the scanning for probe responses to other clients is the only remaining passive scan option but due to the unpredictable nature of this scanning option clients cannot depend on this method for detecting SSID(s) in RF neighborhood. When no other clients are present in the RF neighborhood and beacons do not carry SSID information then passive scanning cannot detect presence of the wireless network.

All clients must rely on active probing to detect the presence of SSIDs in their RF neighborhood since passive scanning alone may not be sufficient to detect the SSID in some scenarios. Also, because passive scanning time is unpredictable, most client implementations of RF neighborhood scanning depend on active probing. Hiding the SSID in the beacon is an option supported by 802.11 standard that leaves probing as the only option for client to discover presence of SSID in the RF neighborhood.

The received power at an 802.11 device (AP or client) is specified by a Received Signal Strength Indicator (RSSI) value typically measured in dBm units. RSSI measurements are available in most modern radio cards for each packet received by the radio card. At lower received RSSI levels the noise in the communication channel starts dominating the total received signal and increases the probability of error in the received packet. Different modulation and coding schemes (MCS) have different tolerances to the noise in the channel with the lower data rate MCS having progressively higher tolerance. Lower data rate MCS can be demodulated cleanly at the receiver at lower RSSI compared to higher data rate MCS for same amount of channel noise. Assuming a fixed transmitter/receiver pair and no interference, the capability to demodulate a signal depends only on the modulation scheme and RSSI. RSSI falls as the transmitter (client) moves away from the receiver (AP).

Since MCS rate used for transmission depends on RSSI and channel noise, the 802.11 transmitter and receiver pairs constantly update the MCS rate used for packet transmission between the pair based on the current RSSI, channel noise and packet error rate. The 802.11 management and control frames are expected to be heard by all devices in the RF neighborhood so these frames are always sent at the lowest basic MCS rate configured for a given 802.11 deployment. Due to this requirement, beacons and probes, which are management frames, are also sent at the lowest basic MCS rate independent of the currently known RSSI and packet error rate between the transmitter and receiver pairs. The size of the beacons and probe frames has increased significantly with advent of 802.11n. Sending these frames at lowest data configured data rates consumes significant air-time in 802.11n deployments.

SUMMARY

Conventional mechanisms such as those explained above suffer from a variety of deficiencies. One such deficiency is that aggressive MUs frequently send probes on all channels in the band to accumulate information about best AP cell in their neighborhood to jump to. Aggressive MUs will associate with the AP from which they receive a highest RSSI and therefore probe very frequently. Aggressive MUs increase the number of probe requests and responses in the wireless medium. Since probe responses are sent at the lowest data rates and are quite large, aggressive MUs reduce the effective throughput of the wireless medium. This problem is more pronounced in 802.11n deployments because the probe and beacon size has also increased significantly with 802.11n standard.

Non-aggressive MUs tend to be much more lazy and sticky. These MUs will stick with an AP even when the data connection rate is low and there is a potential to switch over to another AP and acquire a better data rate. Lower data rate connections also reduce effective throughput of the wireless medium. Both aggressive and sticky MUs affect the network throughput negatively even though the mechanism is different.

Solutions that have been tried by others so far have been to reduce the AP transmit power reducing the effective cell areas, use directional antennas or remove the lower data rates from the supported set of data rates. All these solutions have some drawbacks. If a client maintains association with an access point at lowest data rates, some vendors optimize the air-time by reducing the amount of air-time allocated by the AP for the low-data rate client for downlink traffic. On the uplink direction the AP cannot directly control the air-time usage, but the assumption is that since most clients will have greater downlink traffic than the uplink traffic, optimizing air-time for downlink will solve major part of the air-time problem.

Embodiments of the invention significantly overcome such deficiencies and provide mechanisms and techniques that provide Received Signal Strength Indicator (RSSI) filtering to provide air-time optimization in wireless networks. In a particular embodiment the method includes receiving at the AP at least one message from a mobile unit (MU). The method further includes determining whether an RSSI value associated with the at least one message from a MU is greater than a predetermined threshold. The method additionally includes responding to the at least one message from a MU when the RSSI value associated with the at least one message from a MU is greater than to the predetermined threshold.

Other embodiments include a computer readable medium having computer readable code thereon for providing air-time optimization in wireless networks using Received Signal Strength Indicator (RSSI) filtering. The computer readable medium includes instructions for receiving at the AP at least one message from a mobile unit (MU). The computer readable medium further includes determining whether an RSSI value associated with the at least one message from a MU is greater than a predetermined threshold. The computer readable medium additionally includes instructions for responding to the at least one message from a MU when the RSSI value associated with the at least one message from a MU is greater than to the predetermined threshold.

Still other embodiments include a computerized device (e.g. an Access Point), configured to process all the method operations disclosed herein as embodiments of the invention. In such embodiments, the computerized device includes a memory system, a processor, communications interface in an interconnection mechanism connecting these components. The memory system is encoded with a process that provides air-time optimization in wireless networks using Received Signal Strength Indicator (RSSI) filtering as explained herein that when performed (e.g. when executing), operates as explained herein to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in an AP provides associated operations providing air-time optimization in wireless networks using Received Signal Strength Indicator (RSSI) filtering as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

Figure 1A:
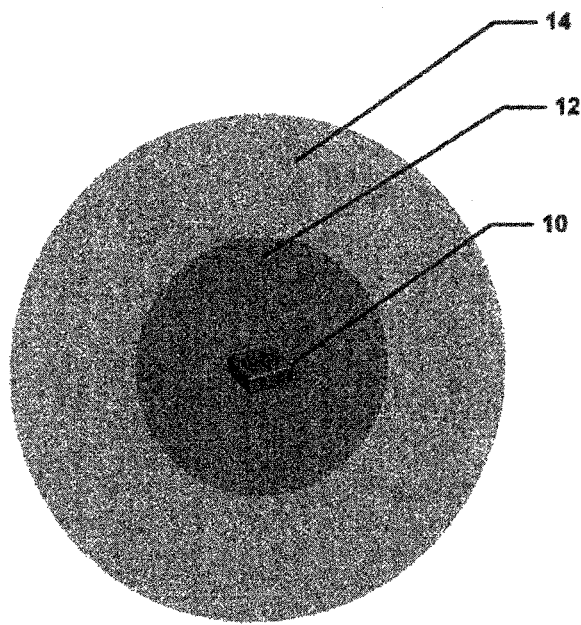
FIG. 1A comprises a diagram showing an Access Point with an AP cell having different data rate cell zones at different ranges from the AP.

An AP cell is a neighborhood around the AP over which a client can demodulate the received signal from the AP cleanly. Referring to FIG. 1A, an AP 10 is shown with its corresponding cell. A first part of the cell 12 supports a higher data rate, while the cell portion further away 14 supports a lower data rate. The size of the AP cell is determined by the radiated power, the transmit antenna, the MU receive antenna, the MU receiver sensitivity and the modulation scheme. Larger radiated power can be received much further away at a given RSSI. Directional antenna's focus the radiated power in a smaller region of space and therefore it can be received further away at a given RSSI in the direction of the antenna. A receiver's antenna can also determine the amount of radiated power that is captured and hence the RSSI at a given distance. Higher data rate modulation schemes are more sensitive to noise and therefore require higher RSSI for clean reception. Thus at higher data rates the effective cell size is smaller.

Figure 1B:
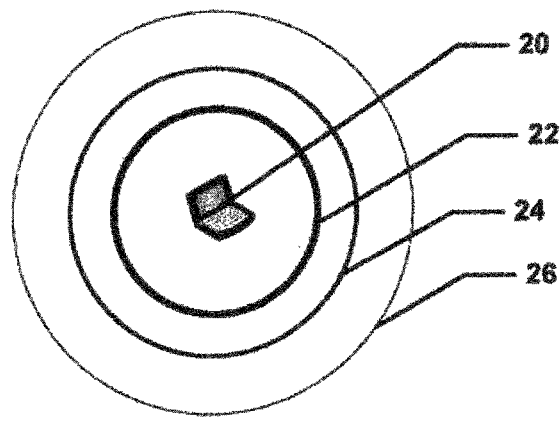
FIG. 1B comprises a diagram showing an Mobile Unit (MU) with an MU cell having different data rate cell zones at different ranges from the MU.

An MU cell is a neighborhood around the MU over which AP(s) and other clients can hear the client transmissions. Referring now to FIG. 1B, an MU 20 is shown. While here the MU is shown as a laptop, it should be understood that the MU could be realized as any mobile device such as a smart phone, tablet, Personal Digital Assistant (PDA) and the like. A first part of the MU cell 22 supports a higher data rate, while the cell portions further away 24 and 26 support increasing lower data rates.

The 802.11 infrastructure network can consist of one or more AP cells with an AP at the center of each cell. Neighboring cells zones can overlap each other. Overlap may be necessary for seamless roaming. Neighboring cells typically use different frequencies to avoid co-channel interference.

The enterprise WLAN deployments provide services to WLAN devices from multiple vendors. These devices have different behaviors with respect to roaming. As described above, some devices are referred to as "sticky" devices and maintain lower data rate connectivity with the AP(s) even though there are better AP options available in closer range while other devices are "aggressive" devices and probe very frequently consuming air-time because probe-responses tend to be big and are sent out at lowest data rates.

The received power of an AP signal (RSSI-AP) at an MU falls as it moves away from the AP. Data rates on the downlink depend on RSSI-AP values with higher downlink data rates possible at higher RSSI-AP values. The received power of an MU signal (RSSI-MU) at an AP falls as MU moves away from the AP. Data rates on the uplink depend on the RSSI-MU values with higher uplink data rates possible at higher RSSI-MU values. Data rates on the downlink depend on RSSI-AP values and higher downlink data rates are possible with higher RSSI-AP values.

Figure 2A:
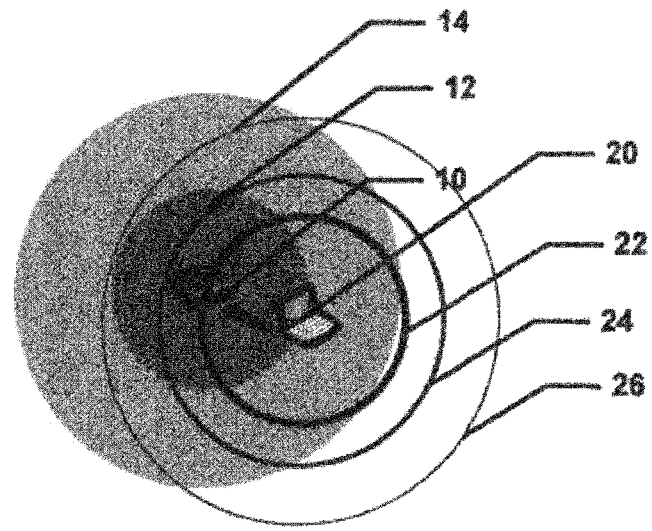
FIG. 2A comprises a diagram showing an Access Point and an MU wherein the MU is in the highest data rate zone of the AP cell and the AP is in the highest data rate zone of the MU cell.

Referring to FIG. 2A, a symmetric link is shown. In this scenario, both the uplink from the MU to the AP and the downlink from the AP to the MU occur at the same data rate. Here, the MU is in the highest data rate of the AP cell, while the AP is in the highest data rate of the MU cell.

Figure 2B:
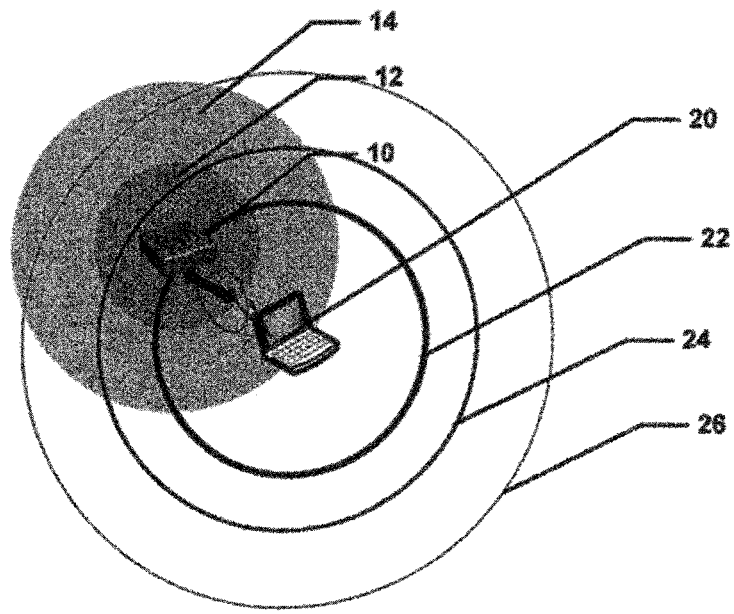
FIG. 2B comprises a diagram showing an Access Point and an MU wherein the MU is not in the highest data rate portion of the AP cell while the AP is in the highest data rate portion of the MU cell.

Referring to FIG. 2B, an asymmetric link is shown. AP radiated power is reduced to achieve a smaller cell while client still transmits at its maximum power. In this case uplink transmission can occur at higher data rates compared to downlink transmission.

Figure 3:
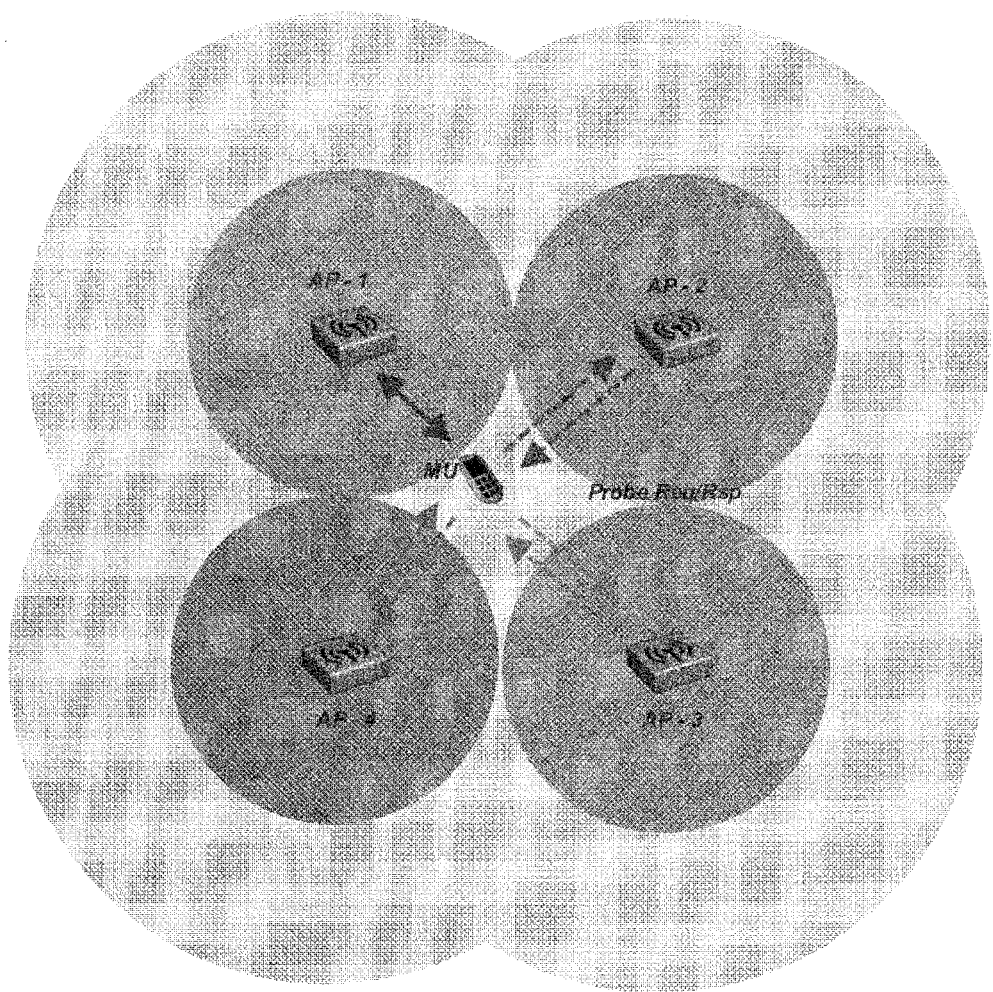
FIG. 3 comprises a diagram showing an MU is associated with one AP but aggressively probing other channels.

Referring now to FIG. 3, an aggressive MU environment is shown. The MU is associated with AP-1 but aggressively probes other channels. The MU keeps sending broadcast/unicast probes to all the APs (AP-2, AP-3 and AP-4) in the neighboring cells. The APs send probe responses at lowest supported data rate consuming wireless medium bandwidth in their cell. Probe responses for 802.11n are very big and can take much longer time to transmit on the air. Each aggressive MU wastes bandwidth in multiple neighboring cells. Multiple MUs can compound this effect.

Figure 4:
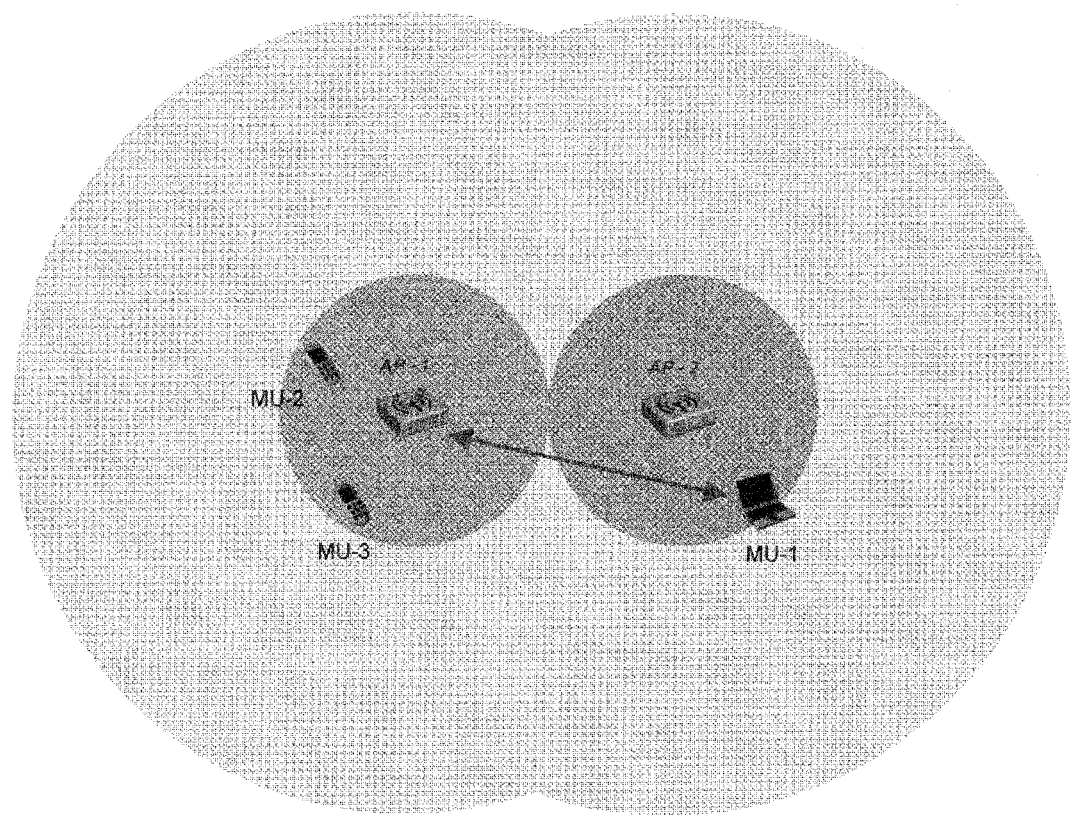
FIG. 4 comprises a diagram showing an MU sticking with an AP even though there is another AP closer.

Referring to FIG. 4, a sticky MU environment is shown. Here the MU is associated with AP-1 even though there is a much better option available (AP-2). The MU sends all communication with AP-1 at the lowest data rate wasting airtime in the AP-1's cell. Other MUs associated with the AP-1 (MU-2 and MU-3) suffer because of the non-aggressive MU. Eliminating lowest supported data rates can solve some of the problems associated with aggressive probing and lazy roaming. Eliminating lowest data rate reduces the effective AP cell size by eliminating outer zones that support lower data rate. Eliminating lowest data rates can completely prevent some clients from associating with the AP(s). Reducing AP radiated power reduces the effective AP cell size, however it also reduces the effective area per cell over which high data rate communication can occur. Reducing AP power makes the AP-MU link asymmetric since clients do not reduce the power (see FIG. 2B).

The use of a directional antenna can focus the radiated power from AP in a smaller region reducing the cell size. Most deployments use omni-directional antenna's that result in bigger AP cell sizes. Directional antennas are typically used only under special scenarios to provide coverage in hallways, stairwells, building edges or meeting-rooms with higher client density. Directional antenna may reduce cell size but the mentioned problems remain at a reduced scale.

As is known in the art, air-time scheduling is done to allocate the wireless medium for downlink traffic from the AP to the client based on last known PHY rate at which the client is connected. By giving equal amount of air-time to each client, the air-time scheduling algorithms ensure a fair allocation of air-time to each client. The fair allocation of air-time translates to a higher bandwidth for clients that connect at better PHY rates for downlink traffic. For uplink traffic there is no direct mechanism available to perform fair allocation. However it is expected that since most protocols are bi-directional, fairness in downlink scheduling may result fairness in improvement in uplink scheduling as well.

A deficiency with the air-time scheduling described above is that it reduces the medium bandwidth wasted by sticky clients. However the sticky clients can still connect from a larger distance from the AP. This means that the communication between AP and client can potentially travel across multiple cells some of them potentially on the same frequency as the client. Allowing a client to connect from a large distance increases the probability of collisions in more than one cell since low data rate communications tend to occupy larger air-time.

The presently disclosed invention utilizes RSSI filtering for selectively accepting or responding to an 802.11 frame based on RSSI or some metric derived from RSSI. An AP will respond to probes only when the probe request is received with sufficient RSSI, will accept authentication only when the RSSI is sufficiently high, and will acknowledge received frames based on some criterion derived from RSSI. RSSI filtering may also be used to dissociate clients based on some RSSI derived criterion. RSSI filtering provides additional control for the administrator besides those provided by eligible data rate set, AP power and directional antenna.

An AP radio is configured with an RSSI threshold for sending probe response. Probe responses are not sent if the received probe requests do not meet the required RSSI threshold. Effectively this is a way of testing if the client is close enough to the AP to benefit from associating with the AP. If the client is not close enough then there is no point indicating anything to the client since it won't associate with the AP anyway. Because of restrained probe responses, a client does not detect presence of an AP until it is close enough.

Figure 5:
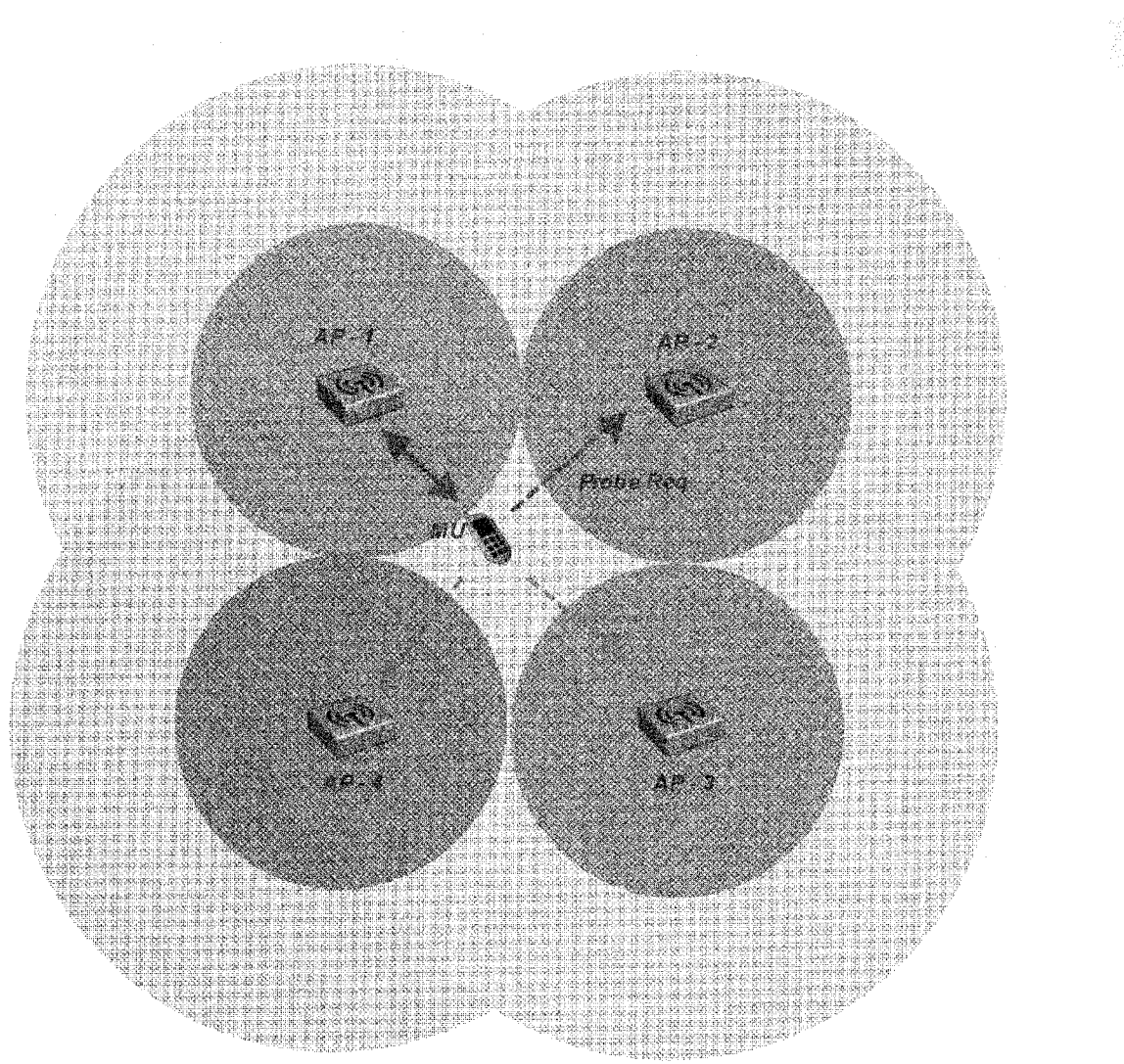
FIG. 5 comprises a diagram showing an MU is associated with one AP but aggressively probing other channels wherein RSSI filtering is used.

Referring now to FIG. 5, the MU is associated with AP-1 but aggressively probes other channels. The MU keeps sending broadcast/unicast probes to all APs (AP-2, AP-3, and AP-4) in the neighboring cells. The APs send probe responses only if the received probe request is above a configured RSSI threshold. Since probe responses consume more air-time than probe request, selectively pruning out probe responses reduces airtime consumed by aggressive clients for probes. The AP radio is configured with an RSSI threshold for sending probe response. Additionally, it is possible to drop authentication requests that do not meet the required RSSI threshold at AP.

When a client sends active probes it will receive responses from closest AP(s) only as defined by configured RSSI threshold. If client determines the AP(s) based on passive scanning, then the authentication attempt to a far-away AP would fail. When a client roams away from an AP its RSSI level at the AP would drop. An AP can accumulate an average of some consecutive samples of the RSSI for the received frames from the client. When this average drops below a threshold then the AP radio can dissociate a client or a more advanced radio can deliberately stop 802.11 ACK for uplink frames from the client. A client in this case would either immediately start looking for another AP in its neighborhood (increased retries due to ACK failures) or will be dissociated for bad behavior and discover another AP nearby.

Figure 6:
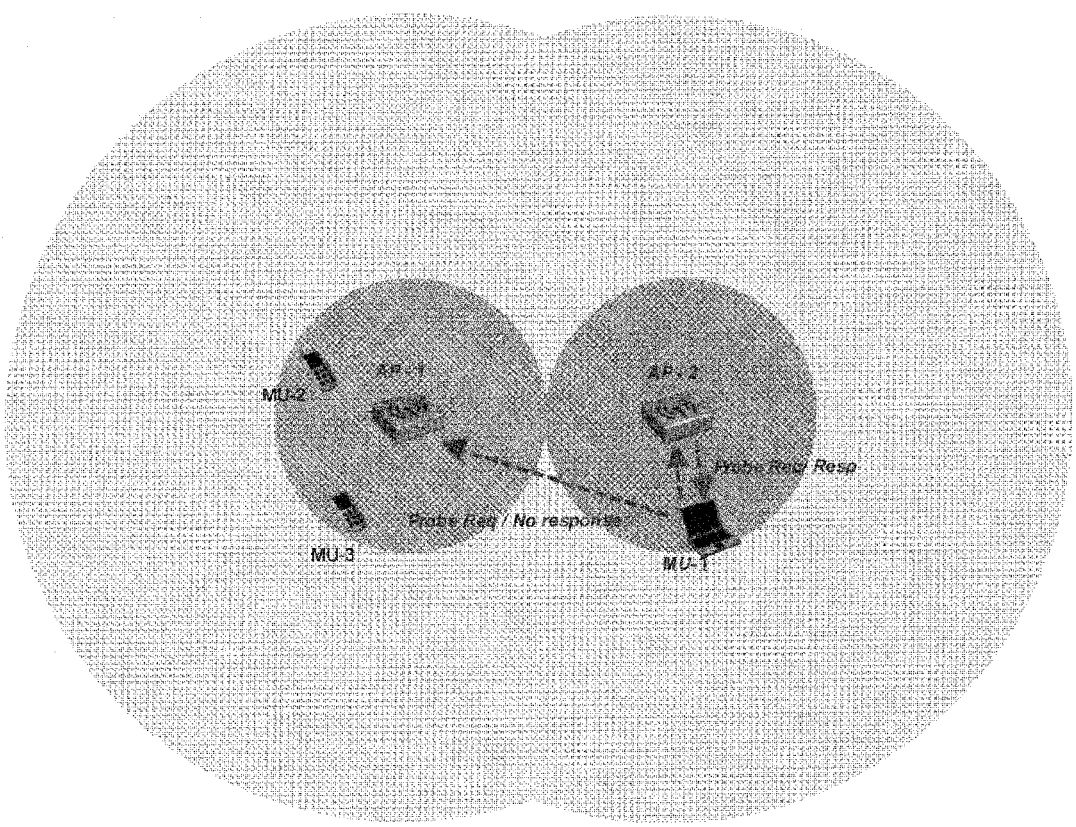
FIG. 6 comprises a diagram showing an MU sticking with an AP even though there is another AP closer wherein RSSI filtering is used.

FIG. 6 shows where an MU scans all channels using active broadcast probing. AP-1 does not respond to probe request since the received RSSI is below the configured threshold for probes. AP-2 responds to the probe request. The MU discovers only AP-2 by active probing. MU-1 authenticates and associates with AP-2 which is the desired AP for MU-1 in this case.

Figure 7:
FIG. 7 comprises a diagram showing an MU roaming from one AP to another

FIG. 7 shows where an MU (MU-1) scans channels passively and hears an AP-1 beacon. The MU attempts to connect to AP-1 right away but fails because it does not meet the RSSI threshold required by AP-1. The MU now moves on to another frequency and discovers AP-2(s) beacon. The MU authenticates and associates with AP-2 which is the ideal AP for MU in this case.

Figure 8:
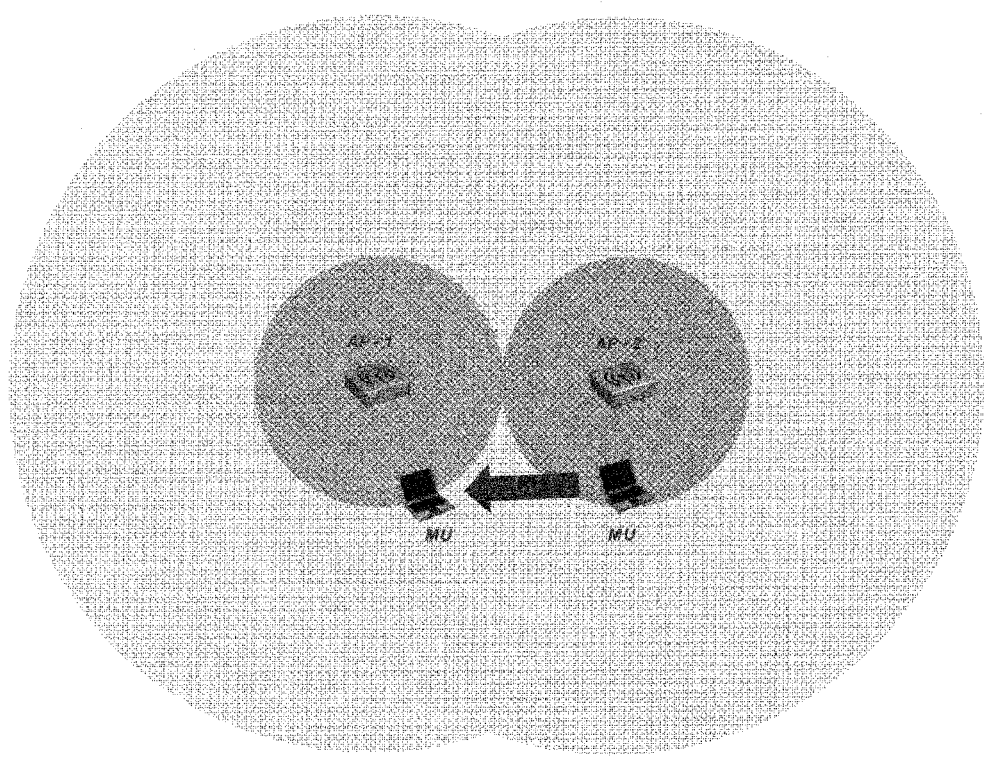
FIG. 8 comprises a diagram showing an MU roaming from one AP to another

In FIG. 8, the MU is associated to AP-2 and starts roaming away from AP-2 towards AP-1. The RSSI received from MU at AP-2 decreases. The average RSSI over few consecutive samples also decreases. When the average RSSI drops below a threshold value, AP-2 stops sending ACK(s) for uplink 802.11 frames from the MU. It is also possible to penalize the MU for not roaming and simply send a dissociate to the MU. The MU detects an increase in retries on the uplink and probes other channels to find a nearby AP-1. The MU then associates with AP-1 and dissociates with AP-2.

Some areas will have a higher density of 802.11 clients—e.g. meeting rooms, trading floors, classrooms and the like. These areas require a larger number of AP(s) each with a small cell size. Typical recommendation for these deployments is to use directional antennas with lower AP power to reduce the cell-size and focus the AP radiated power. RSSI filtering can be used in these deployments to achieve similar results at lower cost.

Figure 9:
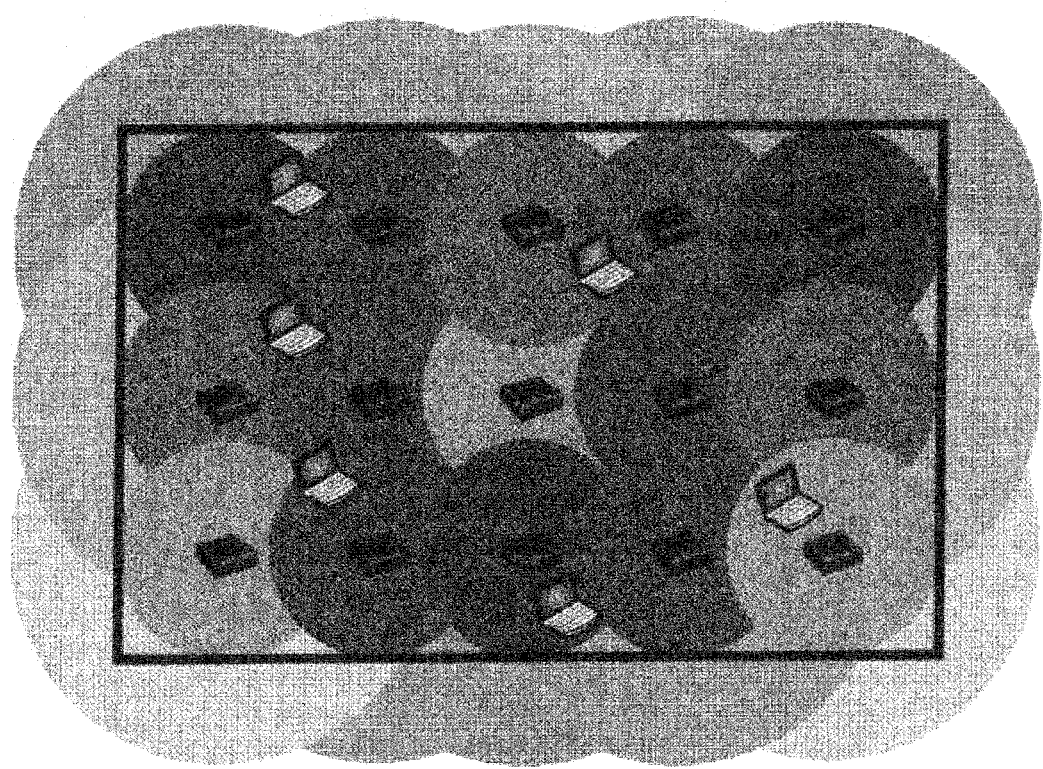
FIG. 9 comprises a diagram showing a microcell deployment.

FIG. 9 shows a pico-cell deployment that would result in a greater overlap of AP cells. Even the high data rate zones may overlap significantly. There is a higher density of clients in pico-cell deployments. Ideally the client should connect to the physically closest AP. Due to the greater overlap of cells, chances are high that a pico-cell deployment will suffer from the aggressive clients and sticky client problem discussed earlier. Pico-cell deployments are typically achieved by using lower AP power, more number of channels and directional antenna. Lowering AP power for achieving pico-cells can result can result in highly asymmetric channels.

Using RSSI filtering in a pico-cell deployments, the RSSI threshold can be tuned appropriately for the desired spacing of AP(s). It may be possible to have a pico-cell deployment without the use of directional antenna(s).

This embodiment relies on the measured RSSI of the client at the AP in making a decision on retaining connectivity with the sticky client at the lowest data rates and in sending probe responses for probe requests from aggressive clients. Most radio cards support the capability to measure RSSI values for every received 802.11 frame. An Administrator can configure two thresholds RSSI_hi and RSSI_lo on each AP in the enterprise deployment. These thresholds can also be determined using some algorithm automatically. One such automatic algorithm can depend on the RSSI detected from the neighboring AP(s) in the deployment to arrive at an estimate for these RSSI thresholds.

Probe responses are sent to MU(s) only when the probe requests from the MU(s) are received with RSSI above the RSSI_hi threshold. This, coupled with the capability to hide SSID in the beacon that exits in the current WLAN products, essentially hides AP(s) that are further away from the client in the WLAN deployment. In other words, only the AP(s) that are in immediate neighborhood of the client will respond to the client's probe requests. This forces the client to join only the AP(s) in the neighborhood of the client and owing to the proximity it achieves connectivity at better PHY rates and hence reduces air-time utilization. Clients that probe aggressively will get probe responses from only closest AP(s). This will reduce the number of probe responses significantly in a pico-cell deployment where AP(s) are closely spaced. It will also show improvement in normal micro-cellular WLAN deployments.

When a client roams away from an AP, the RSSI_lo threshold can be used to make a decision on dropping the client connection. The RSSI_lo value can be compared against an average of sampled RSSI values over multiple received frames from the client. When the average RSSI value falls below the RSSI_lo threshold value, the client will be dissociated by the AP. This penalizes non-aggressive clients for not roaming to a better available AP. In the absence of 802.11k mechanisms it is not possible to indicate a new AP for the client using existing 802.11 messaging mechanism. However this solution is better than letting the client waste air-time for other devices that are behaving well.

The advantages of the solution is it increases overall network throughput achieved by the enterprise WLAN deployment by ensuring that most client associated in each AP cell are connecting at highest data rates supported by the 802.11a/b/g/n standard. This solution achieves this behavior using existing messaging mechanisms in 802.11 standard. Also when 802.11k standard is implemented in future, this mechanism will augment the 802.11k standard by forcing the clients that do not support 802.11k to still choose an AP that is in close proximity. This solution works for pico-cell deployment scenarios also where so far reducing the transmit power of the AP(s) and use of directional antenna(s) have been the primary means of ensuring that clients associate with the AP(s) in the neighborhood.

By eliminating the possibility of a client remaining connected to an AP at lower data rates for long duration, it reduces the need for complex air-time scheduling algorithms and chances of collisions in the wireless medium. Also unlike air-time scheduling that can optimize only downlink direction, this solution ensures that both uplink and downlink transactions occur at higher data rates and therefore optimizes air-time in both uplink and downlink direction.

The solution also reduces the wasting of air-time in probe request/response transaction that is not solved by any air-time scheduling scheme. The 802.11n standard increases the size of the probe responses significantly. Cutting down probe responses will have great reduction in precious air-time wasted on probes in 802.11n deployments.

Figure 10:
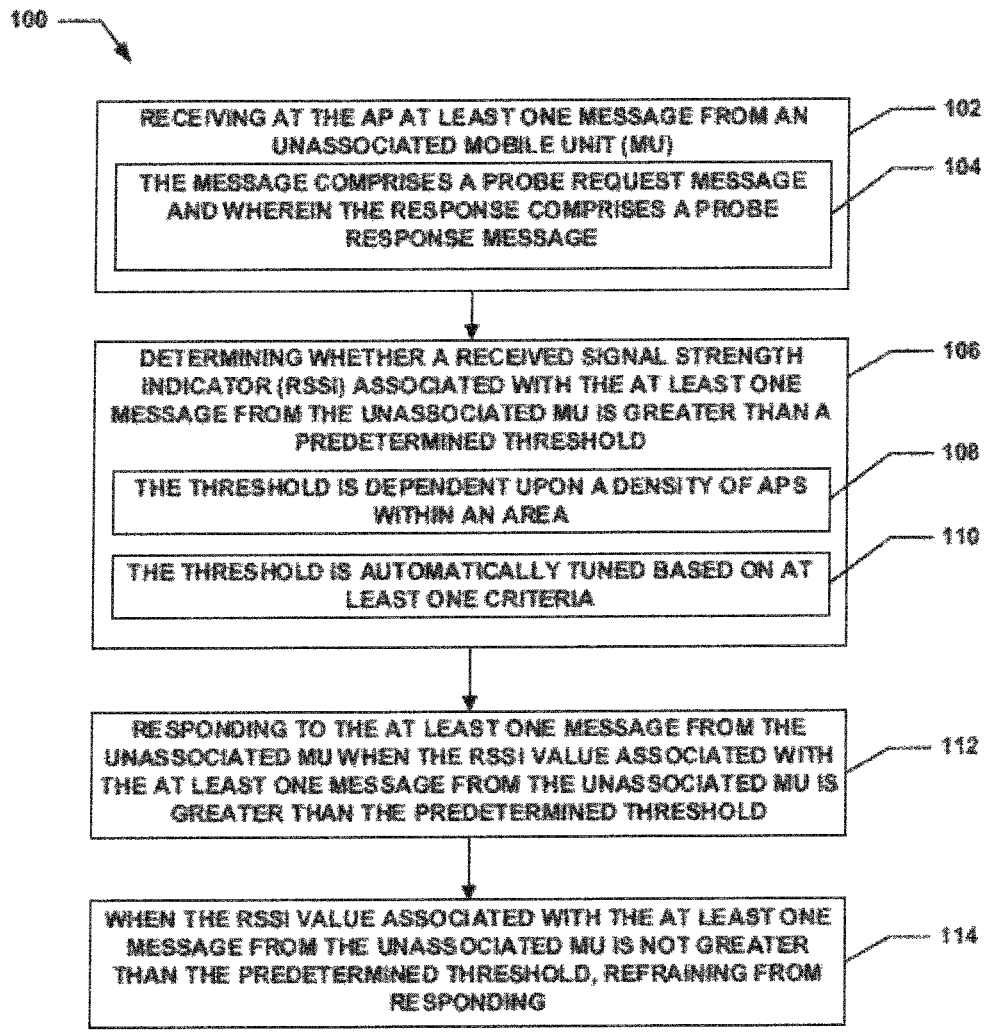
FIG. 10 comprises a flow diagram of a particular embodiment of a method of providing Received Signal Strength Indicator (RSSI) filtering to provide air-time optimization in wireless networks in accordance with embodiment of the present invention.
Figure 11:
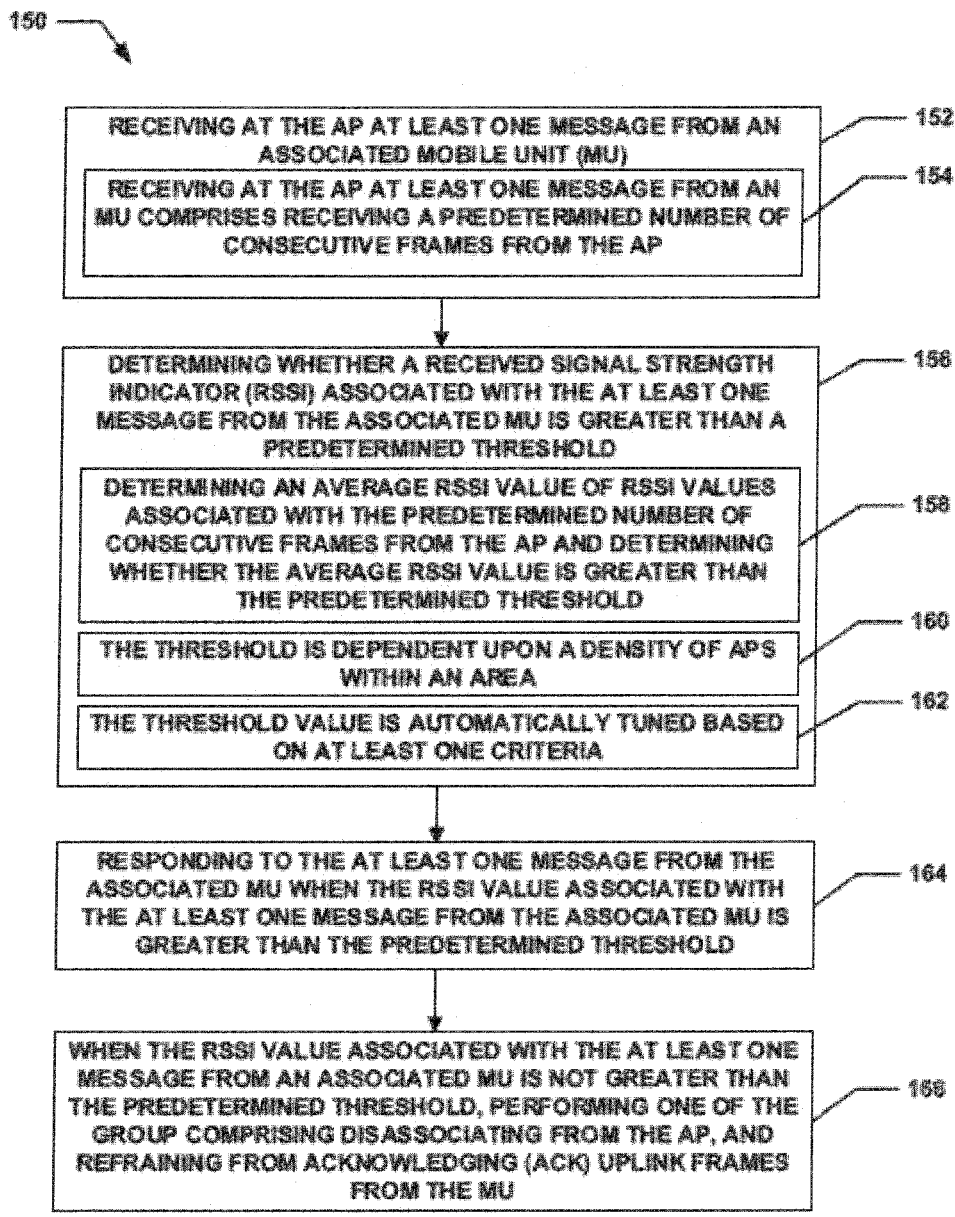
FIG. 11 comprises a flow diagram of another particular embodiment of a method of providing Received Signal Strength Indicator (RSSI) filtering to provide air-time optimization in wireless networks in accordance with embodiment of the present invention.

Flow diagrams of particular embodiments of the presently disclosed methods are depicted in FIGS. 10 and 11. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring to FIG. 10, a particular embodiment of a method 100 for using Received Signal Strength Indicator (RSSI) filtering to provide air-time optimization in wireless networks is shown. This method relates to APs and unassociated mobile units. Method 100 begins with processing block 102 which discloses receiving at the AP at least one message from an unassociated mobile unit (MU) from which RSSI can be determined. As shown in processing block 104, in this embodiment the message comprises a probe request message and wherein the response comprises a probe response message.

Processing block 106 states determining whether a received Signal Strength indicator (RSSI) associated with the at least one message from the unassociated MU is greater than a predetermined threshold. As shown in processing block 108, in certain deployments such as a pico-cell deployment the threshold is dependent upon a density of APs within an area. As shown in processing block 110, in certain embodiments the threshold is automatically tuned based on at least one criteria.

Processing block 112 recites responding to the at least one message from the unassociated MU when the RSSI value associated with the at least one message from the unassociated MU is greater than the predetermined threshold.

Processing block 114 discloses when the RSSI value associated with the at least one message from the unassociated MU is not greater than the predetermined threshold, refraining from responding. This will prevent the MU from associating with the AP.

Referring now to FIG. 11 another particular embodiment of a method 150 for using Received Signal Strength Indicator (RSSI) filtering to provide air-time optimization in wireless networks is shown. This method relates to APs and associated mobile units. Method 150 begins with processing block 152 which discloses receiving at the AP at least one message from an associated mobile unit (MU). As further shown in processing block 154 the receiving at the AP at least one message from an MU comprises receiving a predetermined number of consecutive frames from the AP.

Processing block 156 states determining whether a Received Signal Strength indicator (RSSI) associated with the at least one message from the associated MU is greater than a predetermined threshold. As shown in processing block 158, in one embodiment the determining whether an RSSI value associated with the at least one message from an associated MU is greater than a predetermined threshold comprises determining an average RSSI value of RSSI values associated with the predetermined number of consecutive frames from the AP and determining whether the average RSSI value is greater than the predetermined threshold. As shown in processing block 160, in certain deployments such as a pico-cell deployment the threshold is dependent upon a density of APs within an area. As shown in processing block 162, in certain embodiments the threshold is automatically tuned based on at least one criteria.

Processing block 164 discloses responding to the at least one message from the associated MU when the RSSI value associated with the at least one message from the associated MU is greater than the predetermined threshold.

Processing block 166 states when the RSSI value associated with the at least one message from an associated MU is not greater than the predetermined threshold, performing one of the group comprising disassociating from the AP, and refraining from acknowledging (ACK) uplink frames from the MU. This will result in the MU attempting to associate with another AP.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which an Access Point (AP) performs operations comprising:
    receiving at said AP at least one probe request from an unassociated mobile unit (MU) from which a Received Signal Strength Indicator (RSSI) can be determined;
    determining whether the RSSI associated with said at least one probe request from the unassociated MU is greater than a RSSI_hi threshold, wherein said RSSI_hi threshold is dependent upon a density of APs within an area and wherein said RSSI_hi threshold is tuned for a pico-cell deployment to provide desired spacing of APs within said pico-cell; and
    responding to said at least one probe request from the unassociated MU when said RSSI value associated with said at least one probe request from the unassociated MU is greater than said predetermined RSSI_hi threshold.

2. The method of claim 1 wherein said response comprises a probe response message.

3. The method of claim 1 further comprising, when said RSSI value associated with said at least one probe request from the unassociated MU is not greater than said RSSI_hi threshold, refraining from responding.

4. The method of claim 1 wherein said RSSI_hi threshold is automatically tuned based on at least one criteria.

5. The method of claim 1 further comprising:
    receiving at said AP at least one message from an associated mobile unit (MU);
    determining whether a received Signal Strength indicator (RSSI) associated with said at least one message from the associated MU is greater than a RSSI_lo threshold; and
    responding to said at least one message from the associated MU when said RSSI value associated with said at least one message from the associated MU is greater than said RSSI_lo threshold.

6. The method of claim 5 wherein said receiving at said AP at least one message from an MU comprises receiving a predetermined number of consecutive frames from said AP.

7. The method of claim 6 wherein said determining whether an RSSI value associated with said at least one message from an associated MU is greater than a RSSI_lo threshold comprises determining an average RSSI value of RSSI values associated with said predetermined number of consecutive frames from said AP and determining whether said average RSSI value is greater than said RSSI_lo threshold.

8. The method of claim 5 further comprising, when said RSSI value associated with said at least one message from an associated MU is not greater than said RSSI_lo threshold, disassociating from said AP.

9. The method of claim 5 wherein said RSSI_lo threshold value is automatically tuned based on at least one criteria.

10. An Access Point (AP) comprising:
    a memory;
    a processor;
    a communications interface;
    an interconnection mechanism coupling the memory, the processor and the communications interface; and
    wherein the memory is encoded with an application for using Received Signal Strength Indicator (RSSI) filtering to provide air-time optimization in wireless networks, that when performed on the processor, provides a process for processing information, the process causing the AP to perform the operations of:

receiving at said AP at least one probe request from an unassociated mobile unit (MU) from which a Received Signal Strength Indicator (RSSI) can be determined;

determining whether the RSSI associated with said at least one probe request from the unassociated MU is greater than a RSSI_hi threshold, wherein said RSSI_hi threshold is dependent upon a density of APs within an area and wherein said RSSI_hi threshold is tuned for a pico-cell deployment to provide desired spacing of APs within said pico-cell; and responding to said at least one probe request from the unassociated MU when said RSSI value associated with said at least one probe request from the unassociated MU is greater than said RSSI_hi threshold.

11. The AP of claim 10 wherein said response comprises a probe response message.

12. The AP of claim 10 further comprising, when said RSSI value associated with said at least one probe request from the unassociated MU is not greater than said RSSI_hi threshold, refraining from responding.

13. The AP of claim 10 wherein said RSSI_hi threshold is automatically tuned based on at least one criteria.

14. The AP of claim 10 further comprising:

receiving at said AP at least one message from an associated mobile unit (MU);

determining whether a received Signal Strength indicator (RSSI) associated with said at least one message from the associated MU is greater than a RSSI-lo threshold; and responding to said at least one message from the associated MU when said RSSI value associated with said at least one message from the associated MU is greater than said RSSI_lo threshold.

15. The AP of claim 14 wherein said receiving at said AP at least one message from an MU comprises receiving a predetermined number of consecutive frames from said AP.

16. The AP of claim 15 wherein said determining whether an RSSI value associated with said at least one message from an associated MU is greater than a predetermined threshold comprises determining an average RSSI value of RSSI values associated with said predetermined number of consecutive frames from said AP and determining whether said average RSSI value is greater than said RSSI_lo threshold.

17. The AP of claim 14 further comprising, when said RSSI value associated with said at least one message from an associated MU is not greater than said RSSI_lo threshold, disassociating from said AP.

18. The AP of claim 14 wherein said RSSI_lo threshold value is automatically tuned based on at least one criteria.

* * * * *